United States Patent [19]

Deller et al.

[11] Patent Number: 5,002,917

[45] Date of Patent: Mar. 26, 1991

[54] MOLDED ARTICLES BASED ON PYROGENICALLY PRODUCED TITANIUM DIOXIDE METHOD FOR THEIR MANUFACTURING AND USES

[75] Inventors: Klaus Deller, Hainburg; Rainhard Klingel, Alzenau; Helmfried Krause, Rodenbach, all of Fed. Rep. of Germany

[73] Assignee: Degussa Aktiengesellschaft, Fed. Rep. of Germany

[21] Appl. No.: 488,384

[22] Filed: Feb. 23, 1990

Related U.S. Application Data

[63] Continuation of Ser. No. 305,398, Feb. 2, 1989, abandoned.

[30] Foreign Application Priority Data

Feb. 9, 1988 [DE] Fed. Rep. of Germany ....... 3803894

[51] Int. Cl.$^5$ .......................... B01J 21/00; B01J 21/16
[52] U.S. Cl. ...................................... 502/242; 502/63; 502/350
[58] Field of Search ...................... 502/62, 63, 84, 350, 502/400, 242

[56] References Cited

U.S. PATENT DOCUMENTS

| | | | |
|---|---|---|---|
| 2,862,875 | 12/1958 | Morrell | 502/84 |
| 3,235,512 | 2/1966 | Koepernik | 502/63 |
| 3,937,797 | 10/1976 | Romanski et al. | 502/350 |
| 4,113,660 | 9/1978 | Abe et al. | 502/84 |
| 4,140,654 | 2/1979 | Yoshioka et al. | 502/63 |
| 4,517,069 | 5/1985 | Harney et al. | 502/350 |

FOREIGN PATENT DOCUMENTS 762956  9/1980  U.S.S.R. ............................ 502/400

Primary Examiner—Carl F. Dees
Attorney, Agent, or Firm—Beveridge, DeGrandi & Weilacher

[57] ABSTRACT

The invention concerns pressed pellets based on pyrogenically produced titanium dioxide having the following properties:

| | |
|---|---|
| outside diameter | 2 to 15 mm |
| area according to BET surface DIN 66 131 | 35 to 65 m$^2$/g |
| Total pore volume | 0.3 to 0.8 m$^3$/g |
| crushing strength | 40 to 300 N |
| pore size distribution | no pores <10 nm in diameter, at least 80% of the pores in the range of 10 to 70 nm diameter |
| composition | at least 94% by weight of TiO$_2$ (predominantly, i.e. >50% by weight of anatase) remainder SiO$_2$ and Al$_2$O$_3$. |

They are made by mixing pyrogenically produced titanium with a foaming agent such as urea and with water, where called binder such as kaolin and also with a binder such as kaolin and also with a pelletizing accessory such as wax and by compacting the material which then is dried at a temperature of 80° to 120° C. and is comminuted into a powder which then is pressed by known means and the pressed articles are annealed for 0.5 to 4.5 h at a temperature of 400° to 600° C. The pressed articles are used as catalyst-carriers or as catalysts.

9 Claims, No Drawings

MOLDED ARTICLES BASED ON PYROGENICALLY PRODUCED TITANIUM DIOXIDE METHOD FOR THEIR MANUFACTURING AND USES

This application is a continuation of Ser. No. 305,398 filed Feb. 2, 1989, and now abandoned.

INTRODUCTION AND BACKGROUND

The present invention relates to molded articles based on pyrogenically produced titanium dioxide, the method for making the molded articles from pyrogenically produced titanium dioxide, and their use as catalyst-carriers or catalysts.

Pyrogenically produced titanium dioxide is obtained by high-temperature hydrolysis of vaporizable titanium compound, as a rule titanium tetrachloride, in an oxyhydrogen flame. This procedure is described in German patent 870,242 (1953). The resulting products predominantly possess the structure of anatase. They are hydrophilic, highly pure and are of extremely finely divided particulate form. The primary particles (DIN 53206) when viewed under the electron microscope exhibit spherical shapes and diameters of 10–100 nm. A commercial product has an average particle size of 30 nm. There are no defined agglomerates (DIN 53206). The particle surfaces are smooth and pore-free. There is only an external, easily accessible surface on particles. The specific BET surface depends on the conditions of production and can range between 20 and 100 m$^2$g The above mentioned commercial product has a specific surface of 50±15 m$^2$g.

Because of the high purity, the high specific surface and the lack of pores, pyrogenically produced titanium dioxide is used as the titanium dioxide component or as the carrier in catalytic systems (v. Rives-Arnau, G. Munuera, Appl. Surface Sci. 6 [1980]122; N. K. Nag, T. Fransen, P. Mars, J. Cat. 68, 77 [1981]; F. Solymosi, A. Erdoehelyi, M. Kocsis, J. Chem. Soc. Faraday Trans. 1, 77, 1003 [1981]; D. G. Mustard, C. H. Bartholomew, J. Cat. 67, 186 [1981]; M. A. vannice, R. L. Garten, J. Cat. 63, 255 [1980] and M. A. Vannice, R. L. Garten, J. Cat. 66, 242 [1980]).

However the above cited literature relates only to pulverulent catalytic systems. If now pyrogenically produced titanium dioxide is to be used on an industrial scale in catalytic systems, the powdery, product appropriately must be converted into pressed bodies while substantially retaining its specific surface and the easy accessibility.

Pyrogenically produced titanium dioxide being of particularly finely divided particulate nature, difficulties are encountered when pressing the powder into catalyst-carriers.

The German OLS 31 32 674 describes a procedure for making pressed articles from pyrogenically produced titanium dioxide and employing a silica gel as the binder. Auxilliary pressing aids used are ethane diol, glycerin, erythrite, pentite or hexite. This procedure incurs the drawback that when the pressed articles are made industrially on a large scale, undesired "topping-off" takes place in the pressed articles, that is, an upper layer detaches off the pressed articles.

Moreover, in the prior cut methods besides TiO$_2$, the pressed articles also contain substantial amounts of SiO$_2$ due to the nature of the binder and produces an affect on the catalysis.

The German OLS 32 17 751 discloses the pressing of pyrogenically produced titanium dioxide, wherein organic acids or acidically reacting salts are employed as intermediate binders. In addition, graphite is used as a pressing aid.

This procedure suffers from the drawback that a high annealing temperature exceeding 700° C. is required to remove the graphite.

This is attended by the danger that a phase change may take place in the titanium dioxide. If so, the desired anatase will be converted into the undesired rutile form.

SUMMARY OF THE INVENTION

An object of the present invention is to provide molded; i.e. pressed, articles based on pyrogenically produced titanium dioxide exhibiting the following physical-chemical features:

| | |
|---|---|
| outside diameter | 2 to 15 nm |
| BET surface area according to DIN 66 131 | 35 to 65 m$^2$/g |
| Total pore volume | 0.3 to 0.8 cm$^3$/g |
| pore size distribution | no pores <10 nm at least 80% of pores have diameters in 10–70 nm range |
| crushing strength | 40 to 300 N |
| composition | at least 94% by weight of TiO$_2$ (predominantly, i.e. >50% by weight of anatase) remainder SiO$_2$ and Al$_2$O$_3$. |

Another object of the invention is to provide a method for making pressed articles based on pyrogenically produced titanium dioxide having the following physical-chemical features:

| | |
|---|---|
| outside diameter | 2 to 15 nm |
| BET surface area according to DIN 66 131 | 35 to 65 m$^2$/g |
| Total pore volume | 0.3 to 0.8 cm$^3$/g |
| pore size distribution | no pores <10 nm diameters of at least 80% of pores in 10–70 nm diameter range |
| crushing strength | 40 to 300 N |
| composition | at least 94% by weight of TiO$_2$, (predominantly, i.e. >50% by weight of anatase), remainder SiO$_2$ and Al$_2$O$_3$ | which is characterized in that pyrogenically produced titanium dioxide is mixed with a forming agent, for instance urea, further with water and where called for with a binder such as kaolin. Optimally a pelletizing aid such as wax can also be added. The resulting mixture is then compacted, whereupon the substance so prepared is dried at a temperature between 80 and 120° C. and is comminuted into a powder. The powder is pressed using known equipment into molded articles which than are annealed at a temperature of 400° to 600° C. for ½ to 4½ h.

Other applicable forming agents than urea may be sugar and/or starch. In a preferred implementation of the invention, urea, sugar and starch may be added in aqueous solution.

In a special embodiment of the invention, the mixture may be composed as follows prior to pressing:

50 to 90% by weight of titanium dioxide, preferable 70-85% by weight 5 to 50% by weight of urea, preferably 15 to 30% by weight, 0.1 to 5% by weight of kaolin, preferably 1 to 4% by weight, 0.1 to 10% by weight of wax, preferably 1 to 5% by weight.

In principle, any mixer apparatus or mill is suitable when carrying out the method of the invention, provided it permits good homogenizing, for instance by paddle, fluidization, impeller or air-flow mixers. Especially suitable mixers allow for additional compaction of the mixed material. Illustratively, such mixers are plow-share mixers, pan grinders or muller mixers or ball mills. Following homogenization, the material may be substantially dried at 80°-120° C. A friable or free flowing product is obtained following comminution. The making of the molded articles can be carried out using stamping presses, eccentric presses, continuous extruders or revolving presses, or further using compactors. The molded articles can be in any shape such as pellets, rods, or annular shaped bodies.

By varying the amounts of the initial materials and the molding pressure, the crushing strength, the specific total surface and the pore volume may be controlled within limits.

During or after their production, the molded articles of the invention can be impregnated with a solution of a catalytically active substance and optionally can be activated by suitable post-treatment. Such products can be used either directly as catalysts or as catalyst-carriers. The compositions and procedures for applying catalytically active substances to carriers or supports are well known and understood in industry.

The molded articles of the invention offer the following advantages:

They exhibit the anatase-modification. They are of high mechanical strength and have a high pore volume, with a predominant pore portion in the mesopore range. No pores 10 nm are present.

DETAILED DESCRIPTION OF THE INVENTION

EXAMPLES

The pyrogenically produced titanium dioxide P 25 is used in the Examples; which has the following physical-chemical properties:

|  | $TiO_2$ P 25 |
| --- | --- |
| BET surface | $50 \pm 15$ m$^2$/g |
| Mean particle size | 30 nm |
| Typical DIN 53 194 compaction density | about 150 g/l |
| DIN 55 921 drying losses(2 h at 105° C.) | <1.5% |
| Annealing loss *(2 h at 1,000° C.) DIN 55 921 | <2% |
| DIN 53 200 pH value (in 4% aqueous dispersion) | 3-4 |
| $SiO_2$** | <0.2% |
| $Al_2O_3$** | <0.3% |
| $Fe_2O_3$** | <0.01% |
| $TiO_2$** | >99.5% |
| HCl** *** | <0.3% |

*relative to the substance dried for 2 h at 105° C.
**relative to the substance annealed for 2 h at 1,000° C.
***the HCl content is a component of the annealing loss.

The BET surface is determined per DIN 66 131 with nitrogen.

The total pore volume is computed from the sum of the micro-, meso- and macro-pores.

Crushing strength is determined by means of the type TBH 28 tester from Erweka Co.

The micro- and meso-pores are determined by an $N_2$ isotherm and evaluating it by BET, de Boer & Barret, Joyner, Halenda.

The macro-pores are determined by the Hg penetration procedure.

Any suitable pyrogenically produced titanium dioxide can be used for purposes of invention.

Example 1 (Control test)

77% of titanium dioxide P 25
15% urea
4% kaolin, and
4% graphite are compacted while water is added and are dried for 24 h at 100° C. and then are comminuted into friable powder.

An eccentric press is used for pelletizing.

The crude pellets are annealed for 4 hours at 900° C. The molded articles so made exhibit the following physical chemical properties:

| outside diameter | 4 mm |
| --- | --- |
| BET surface area according to DIN 66 131 | 7 m$^2$/g |
| Total pore volume | 0.13 ml/g |
| crushing strength | 570 N |
| composition: 95% $TiO_2$; 2.5% $SiO_2$; 2.5% $Al_2O_3$. | |

This Example shows that because of the high annealing temperature, the anatase phase was converted into the rutile phase. While these molded articles are highly resistant to rupture, the catalytic activity is significantly degraded by the reduction of the specific surface and of the pore volume.

Example 2

78% titanium dioxide P 25
2% kaolin, and
20% urea are mixed and compressed into pellets in the manner of Example 1. The molded articles exhibited the following physical-chemical properties:

| outside diameter | 9 mm |
| --- | --- |
| BET surface area according to DIN 66 131 | 38 m$^2$/g |
| Total pore volume | 0.59 ml/g |
| pore size distribution | no pores with <10 nm diameter 85% of pores are in range of 10 to 75 nm diameter |
| crushing strength | 53 N |
| composition 97.5% $TiO_2$; 1.3% $SiO_2$; 1.2% $Al_2O_3$. | |

Example 3

80% titanium dioxide P25, and
20% urea are mixed, dried and pressed in the manner of Example 1.

The crude pellets are annealed for 4 h at 450° C. The molded articles so made have the following physical-chemical properties.

| | |
|---|---|
| outside diameter | 9 mm |
| BET surface area according to DIN 66 131 | 51 m$^2$/g |
| Total pore volume | 0.43 ml/g |
| pore size distribution | no pores with <10 nm 83% of pores are in the range of 10 to 75 nm diameter |
| crushing strength | 68 N |
| composition | 100% TiO$_2$. |

Example 4

77.0% of titanium dioxide P 25
3.8% kaolin
3.8% microcrystalline wax C, and
15.4% urea are mixed, dried and pressed in the manner of Example 1. The crude pellets are annealed for 4 hours at 600° C.. The molded articles so obtained exhibit the following physical-chemical properties:

| | |
|---|---|
| outside diameter | 9 mm |
| BET surface area according to DIN 66 131 | 43 m$^2$/g |
| Total pore volume | 0.30 ml/g |
| pore size distribution | no pores with <10 nm diameter 86% of pores are in the range of 10 to 70 nm diameter |
| crushing strength | 244 N |
| composition | 95% by weight TiO$_2$; 2.5% by weight SiO$_2$; 2.5% by weight Al$_2$O$_3$. |

Further variations and modifications of the foregoing will be apparent to those skilled in the art and are intended to be encompassed by the claims appended hereto German priority application P 38 03 894.3-45 is relied on and is incorporated herein.

We claim:

1. A molded article formed from a composition comprising pyrogenically produced titanium dioxide having been shaped in the desired form and fired, said molded article having the following physical-chemical properties:

| | |
|---|---|
| outside diameter | 2 to 15 mm |
| BET surface area per DIN 66 131 | 35 to 65 m$^2$/g |
| total pore volume | 0.3 to 0.8 cm$^3$/g |
| pore size distribution | no pores <10 nm diameter, at least 80% of the pores are in the range of 10 to 70 nm |
| crushing strength | 40 to 300 N |
| composition | at least 94% by weight of TiO$_2$ (predominantly; i.e. <50% by weight of anatase), remainder SiO$_2$ and Al$_2$O$_3$. |

2. A method for making a molded article from a composition comprising pyrogenically produced titanium dioxide said molded article having the following physical properties:

| | |
|---|---|
| outside diameter | 2 to 15 mm |
| BET surface area per DIN 66 131 | 35 to 65 |
| total pore volume | 0.3 to 0.8 cm$^3$/g |
| pore size distribution | no pores <10 nm diameter, at least 80% of the pores are in the range of 10 to 70 nm |
| crushing strength | 40 to 300 N |
| composition | at least 94% by weight of TiO$_2$ (predominantly; i.e. <50% by weight of anatase), remainder SiO$_2$ and Al$_2$O$_3$. | comprising mixing a pyrogenically produced titanium dioxide with a forming agent, and in the presence of water to form a homogeneous mixture, compacting the mixture, drying the mixture at a temperature of 80° to 120° C. and comminuting the mixture into a powder, processing the powder into a molded article which is then annealed for 0.5 to 4.5 hours at 400° to 600° C.

3. The method according to claim 2 wherein urea is the forming agent.

4. The method according to claim 2 wherein kaolin is added to the mixture prior to forming a homogeneous 5. The method according to claim 2 wherein a pelletizing aid is added to the mixture prior to compositing.

6. The method according to claim 5 wherein the aid

7. The method according to claim 2 wherein the forming agent is sugar or starch.

8. A catalyst support in the form of the molded article of claim 1 in the form of a pellet, rod, or annular shape.

9. A catalyst comprising the catalyst support of claim 8 having deposited thereon a catalytically active substances.

* * * * *